B. E. CARRM.
CONVERTIBLE VEHICLE BODY.
APPLICATION FILED FEB. 26, 1918.
1,426,153.
Patented Aug. 15, 1922.
4 SHEETS—SHEET 1.
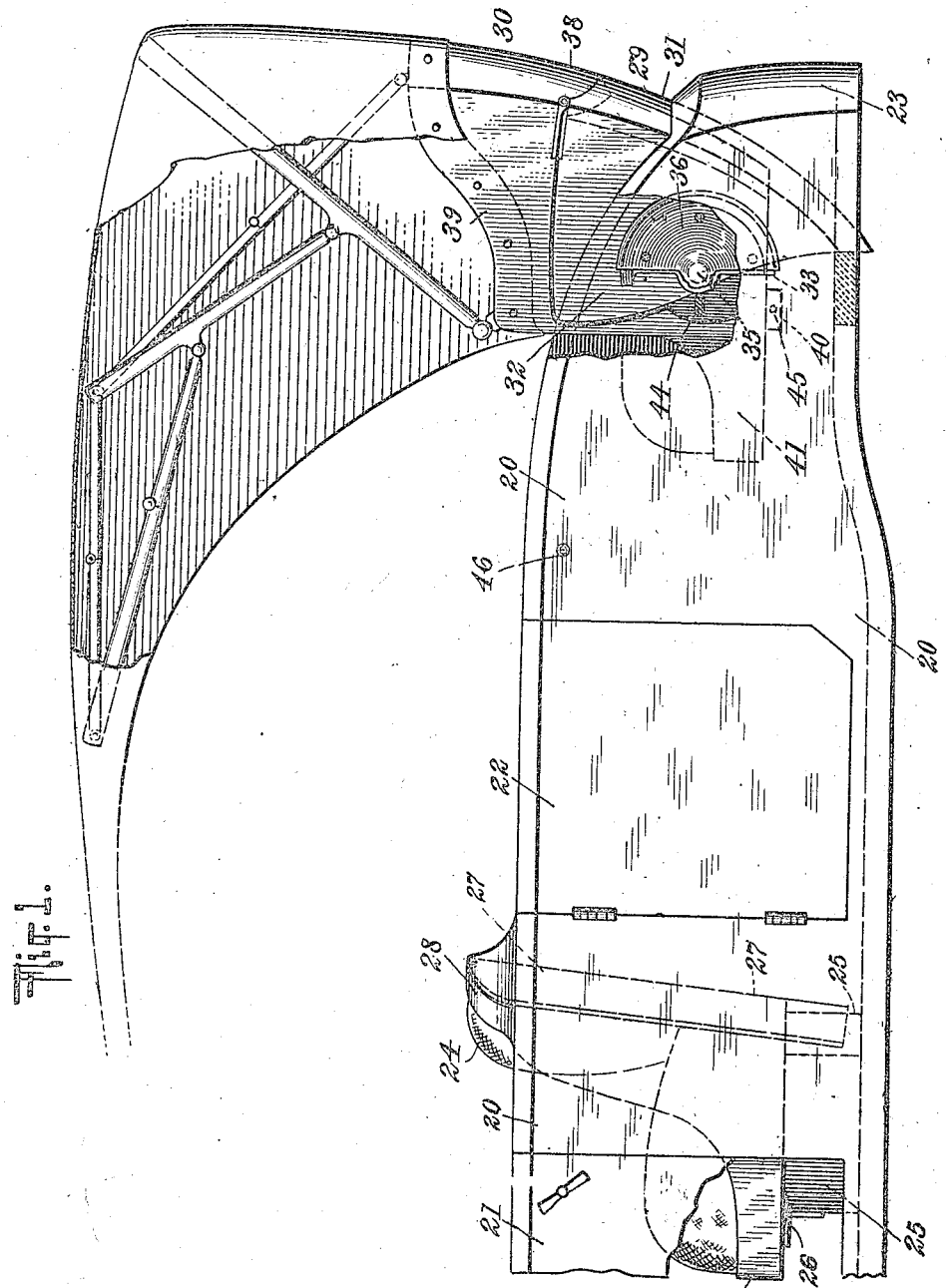
INVENTOR
Bazel E. Carrm
BY
Conrad A. Dieterich
his ATTORNEY

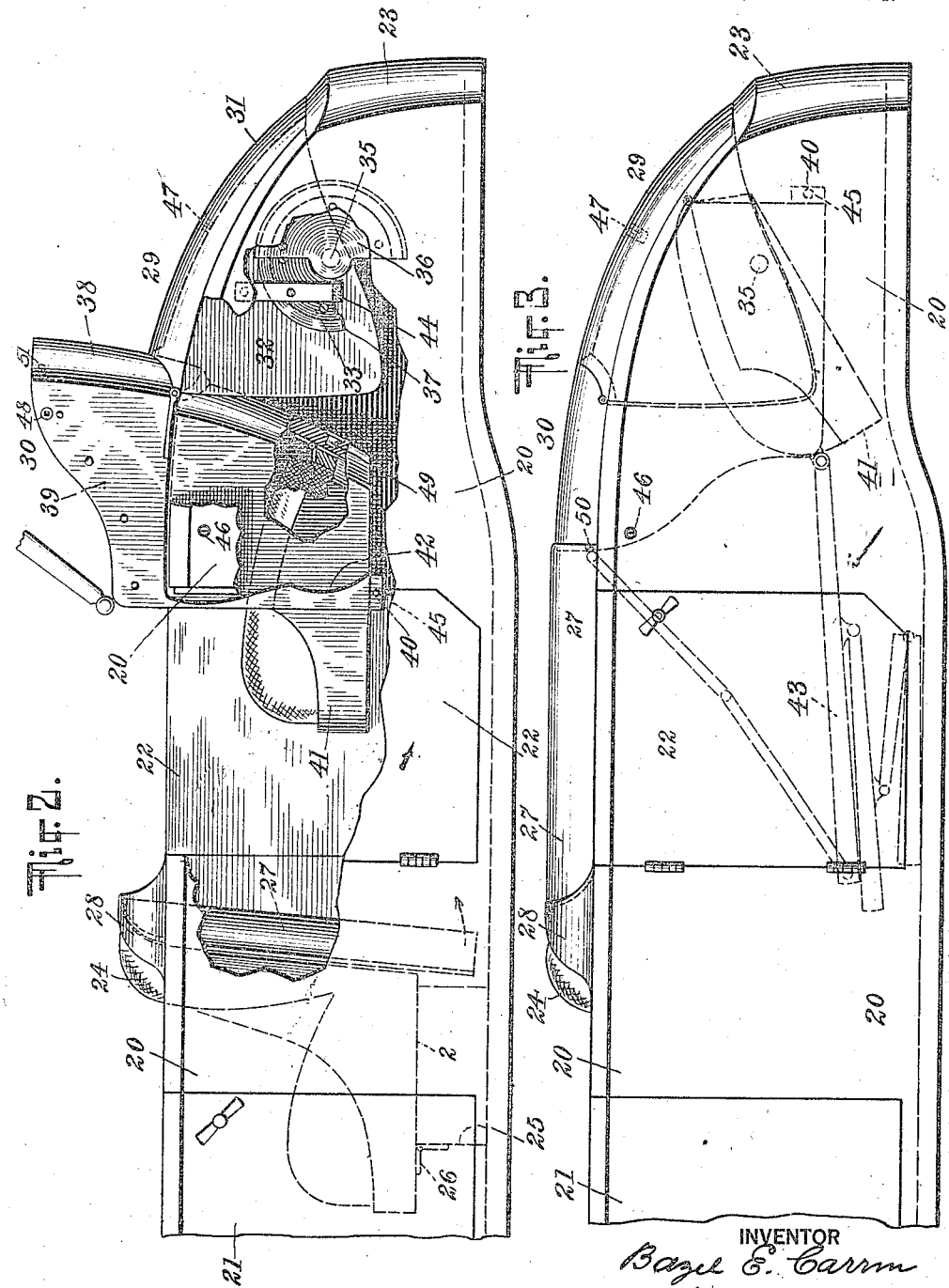

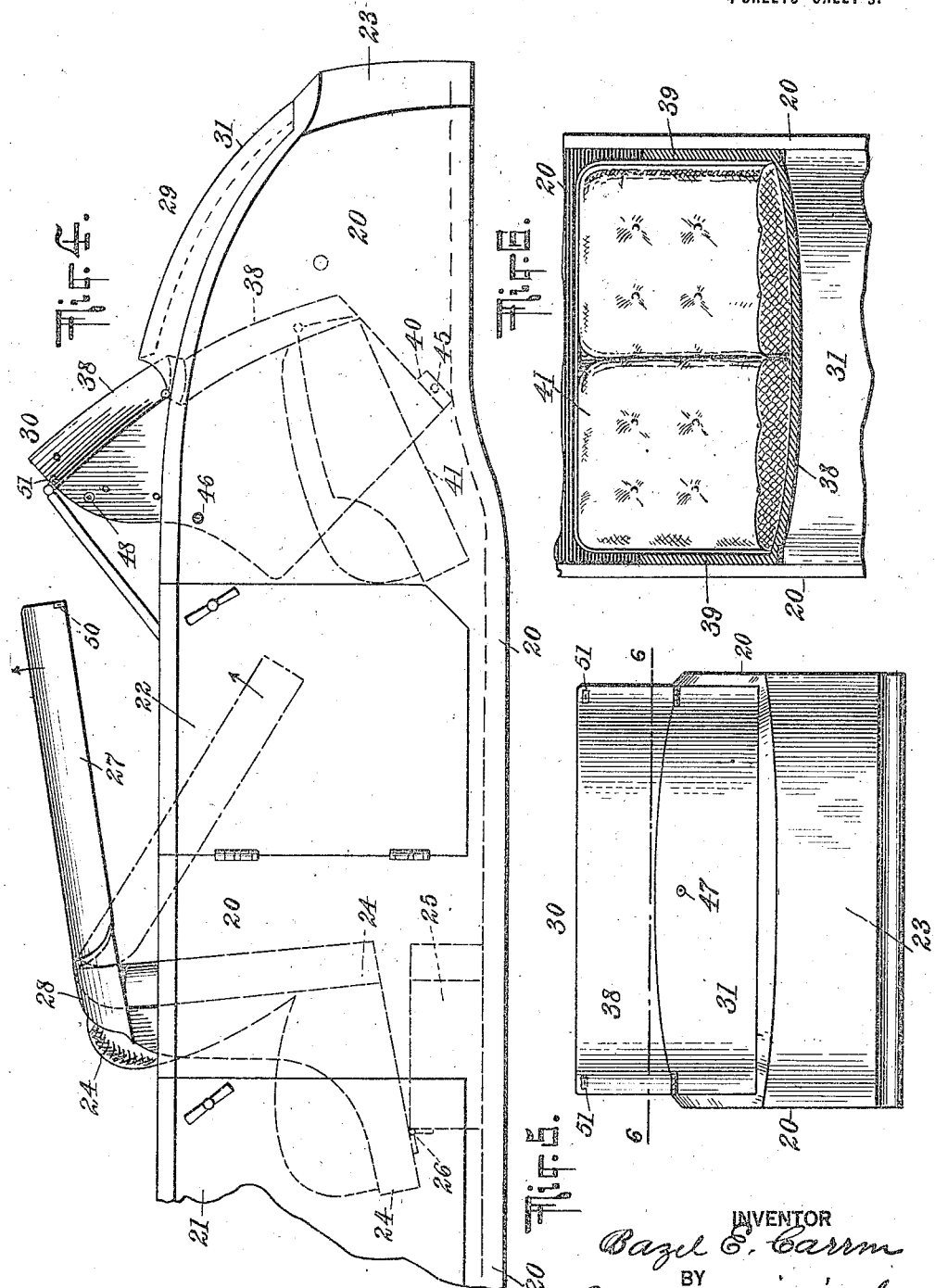

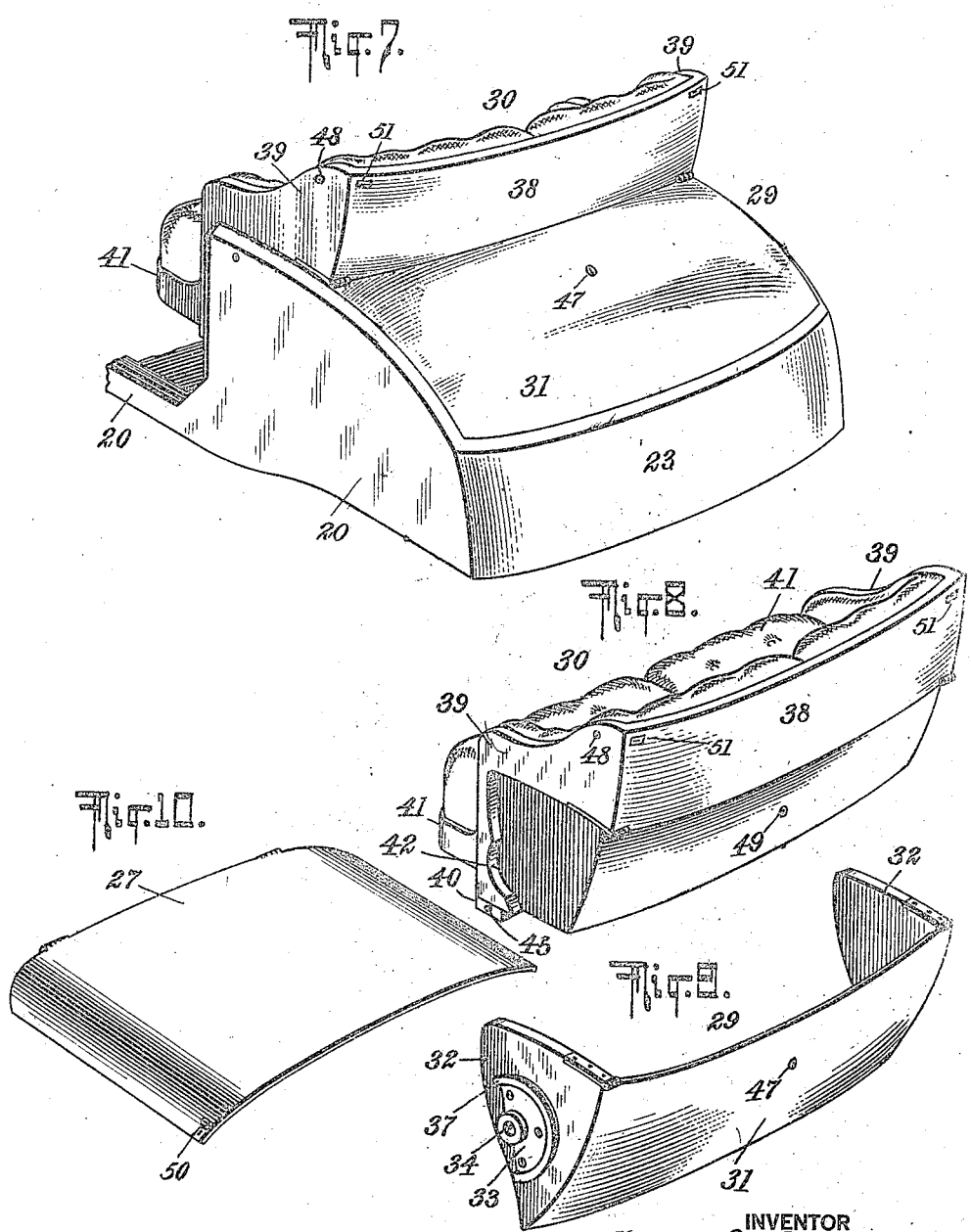

UNITED STATES PATENT OFFICE.

BAZEL E. CARRM, OF NEW YORK, N. Y.

CONVERTIBLE VEHICLE BODY.

1,426,153.   Specification of Letters Patent.   Patented Aug. 15, 1922.

Application filed February 26, 1918. Serial No. 219,236.

*To all whom it may concern:*

Be it known that I, BAZEL E. CARRM, residing at the city of New York, borough of Manhattan, in the county and State of New York, have invented certain new and useful Improvements in Convertible Vehicle Bodies, of which the following is a full, clear, and exact specification.

This invention relates to improvements in convertible vehicle bodies and the same is more particularly applicable for use in connection with automobiles employed for the accommodation of passengers.

One of the objects of said invention is to provide a body which may quickly and readily be converted into any one of a plurality of types or styles.

Further, said invention has for its object to provide a vehicle body which may be so adjusted at will as to convert the vehicle into a runabout, a small size touring car capable of accommodating four passengers, or a larger touring car capable of accommodating seven passengers.

Further, said invention has for its object to provide a vehicle body comprising a fixed main section, and a movable rear section adapted to occupy a plurality of positions and provided with a seat adapted to occupy an operative position when said rear section is in any one of its positions.

Further, said invention has for its object to provide a vehicle body comprising a fixed main section having a front compartment, a movable rear section adapted to be adjusted to form a rear compartment or to form part of a deck for the rear portion of said main section, and means co-acting with said rear section and serving to complete the deck for the rear portion of said main section between the front and rear seats.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings showing an illustrative embodiment of the invention;

Figure 1 is a view in side elevation, partly broken away and in section, of an automobile body constructed according to and embodying my said invention, the body being shown adjusted for use as a large size or seven passenger touring car;

Fig. 2 is a similar view showing the body adjusted for use as a small size or four passenger touring car;

Fig. 3 is a view in side elevation showing the body adjusted for use as a runabout;

Fig. 4 is a similar view showing the position of the parts in the course of adjustment from a four passenger touring car to a runabout, or vice versa;

Fig. 5 is a rear view of the body when adjusted for use as a four passenger touring car, as shown in Fig. 2;

Fig. 6 is a sectional view taken on the line 6—6 of Fig. 5;

Fig. 7 is a detail perspective view showing the position of the parts adjusted for use as a four passenger touring car;

Fig. 8 is a detail perspective view of the upper portion of the rotatable rear section;

Fig. 9 is a similar view of the lower portion thereof, and

Fig. 10 is a detail perspective view of the hinged deck member.

Referring to the drawings, the automobile body, which may be mounted upon a chassis of any desired construction, comprises a fixed main section having side walls 20 extending throughout the length thereof, to which are hinged front doors 21 and rear doors 22. The side walls 20 are connected at their rear ends by a transverse member 23 serving as the rear wall of the body.

Positioned within the front compartment is a seat 24 of any suitable construction, resting upon a support 25, to which it is secured by a hinge 26, so arranged as to permit the seat 24 to be tilted forwardly, as shown in Fig. 4, for a purpose hereinafter set forth. Hinged to the rear wall of the seat 24, at the upper edge thereof, is a transversely-curved deck member 27, which normally occupies a substantially vertical position to the rear of the front seat 24 when the body is adjusted for use as a touring car for either seven or four passengers, as shown in Figs. 1 and 2. When the body is adjusted for use as a runabout, the deck member 27 is swung upwardly into a horizontal position and serves to form a part of the deck for the portion of the main section of the body in rear of the front compartment as shown in Fig. 3, and as hereinafter more fully described. When in its horizontal position, the forward edge of the deck member 27 co-acts with the rear edge of the intermediate cowl 28, secured to the seat 24, to form a close fitting joint.

Rotatably supported upon the side walls 20 of the main section, adjacent the rear thereof, is a rear section comprising lower and upper portions 29 and 30. The lower portion 29 of the rotatable section comprises a rear wall 31 and side members 32, whose outer surfaces are flush with the inner surfaces of the side walls 20 of the fixed main section. Secured to the side members 32 are plates 33 having sockets 34 formed therein, into which extend studs 35 projecting inwardly from plates 36 carried by the side walls 20 of the main section. The plates 33 are further provided with arc-shaped guide-members 37 slidingly engaging similarly shaped guideways formed in the plate 36.

The upper portion 30 of the rear section comprises a rear wall 38, side members 39 and a transverse member 40 secured to the bottom edges of the side members 39 at the front thereof. A seat 41, hinged to the rear wall 38 in such a manner that it may be folded upwardly with respect thereto, engages with and is supported by the transverse member 40 when the body is adjusted for use as a touring car, of either the four passenger or seven passenger type. The upper portion 30 of the rear section is hinged, intermediate its height, to the lower portion 29 at the top thereof, and is recessed, as indicated at 42, to receive the end members 32 and rear wall 31 of the lower portion 29, when the body is adjusted for use as a seven passenger touring car or as a runabout, see Figs. 1 and 3. In this position of the parts the outer surfaces of the upper portion 30 will form continuations of the outer surfaces of the lower portion 29.

The rear walls 31 and 38 of the lower and upper portions 29 and 30, respectively, of the rear section, are curved, as shown, so that, when the rear section is rotated into the position it occupies when the body is adjusted for use as a runabout, as shown in Fig. 3, in which position the rear walls form a part of a deck for the portion of the main section in rear of the front compartment, the body will have the appearance and form of the so-called "turtle-back" type of body. A top 43, preferably of the folding type, is secured to the upper portion 30 of the rear section.

The body may be converted from any one of the types to any other thereof as follows:—

Assuming the body to be used as a large size or seven passenger touring car with the parts in position as shown in Fig. 1, in which the lower and upper portions 29 and 30 of the rear section are substantially vertical, if it is desired to convert the body into a four passenger touring car, the lower portion 29 of the rear section is rotated about its supporting studs 35 in a forward direction through an angle of substantially ninety degrees, the upper portion 30 being maintained in an upright or vertical position by reason of its hinged connection with the lower portion 29, the parts occupying the positions shown in Fig. 2. Secured to the side walls 20 of the main section are L-shaped stop members 44, the horizontal portions of which are adapted to be engaged by the plates 33 carried by the lower portion 29 of the rotatable section to limit the forward movement thereof and to support the same in its adjusted position. The upper portion 30 of the rear section is locked against movement, by suitable spring pressed bolts 45, carried by the transverse member 40, engaging sockets in the side walls 20 of the main section. The curvature of the rear walls 31 and 38 is such that, when the parts are in the position shown in Fig. 2, the curved upper edge of the rear wall 31 of the lower portion 29 will engage with and conform to the curved surface of the rear wall 38 of the upper portion 30 to form a close-fitting joint therewith.

To adjust the body for use as a runabout, the bolts 45 are withdrawn from their co-acting sockets and the upper portion 30 of the rear section is rotated about its hinges into the position shown in Fig. 3, the seat 41 being swung upwardly, as indicated in dotted lines in said figure, in order to permit the proper positioning of the portion 30 within the main section. The portion 30 is locked against movement by suitable locks 46 and 47, carried by the side walls 20 of the main section and the rear wall 31 of the lower portion of the rear section, engaging co-acting locking members 48 and 49 carried by the upper portion 30. The top 43 is folded within the main section in rear of the front seat 24. When the rear section is thus positioned, the rear walls 31 and 38 of the lower and upper portions 29 and 30 thereof serve as the rear part of a deck of the "turtle-back" type. In order to complete the deck, the front seat 24 is tilted forwardly about the hinges 26, and the deck member 27 is swung upwardly into the position shown in Fig. 4. The front seat 24 is then returned to its normal position upon the support 25 thus causing the rear end of the deck member 27 to overlap and engage the forward end of the rear wall 38 of the upper portion 30 of the rear section to form a close-fitting joint therewith, as shown in Fig. 3. When the deck member 27 is in this position its front end is over-lapped by the intermediate cowl 28 upon the front seat 24, whereby a close-fitting joint is formed.

As the curvature of the deck member 27 conforms to the curvature of the rear walls 31 and 38 of the rear section, a neat-appearing deck of the "turtle-back" type is provided for that portion of the main section which lies to the rear of the front seat 24.

The deck member 27 is secured in position by means of suitable locks 50 carried thereby and engaging co-acting locking members 51 carried by the rear wall 38 of the upper portion 30 of the rear section.

The body may, of course, be converted from a seven passenger touring car to a runabout by rotating the rear section, as a whole, from the position shown in Fig. 1 into the position shown in Fig. 3, after which the deck member 27 may be adjusted to occupy its operative position, as above described.

Having thus described my said invention what I claim and desire to secure by Letters Patent is:—

1. A convertible vehicle body comprising a fixed main section having a front compartment, a seat in said compartment, a deck member pivotally supported in the rear of said front compartment, a rear seat member pivotally secured intermediate its seat and back to said pivotally supported member; said rear seat member, in one of its positions constituting a continuation of said pivotally supported deck member, and a member pivotally secured adjacent to the upper end of said front seat, serving jointly with said rear seat member and the deck member first named to form a complete enclosure for the portion of said fixed main section to the rear of said front seat, substantially as specified.

2. A convertible vehicle body comprising a fixed main section having a front compartment, and a section in the rear of said front compartment; said last mentioned section comprising a lower portion and an upper portion movably supported thereon, means for adjusting said lower portion to a plurality of positions with respect to said vehicle body, and means for adjusting said upper portion to a plurality of positions with respect to its lower portion, when said lower portion is in one of its adjusted positions; the rear walls of said upper and lower portions being conformed to said vehicle body whereby to form a close fitting joint between said walls and said body portion, when said movable upper portion is in either of its adjusted positions, substantially as specified.

3. A convertible vehicle body comprising a fixed main section having a front compartment, and a section in rear of said front compartment; said last mentioned section having a lower portion movably supported with respect to said main section and adjustable with respect thereto to occupy a plurality of positions and an upper portion movably supported upon said lower portion, said upper portion being adapted to occupy a vertical position when said lower portion is in either of its adjusted positions and to occupy a horizontal position when said lower portion is in one of its adjusted positions, the rear walls of said lower and upper portions of said rear section being shaped to conform to each other to form a close-fitting joint between said portions when they are in their several adjusted positions, substantially as specified.

Signed at the city of New York, in the county and State of New York, this 19th day of February, one thousand nine hundred and eighteen.

BAZEL E. CARRM.

Witnesses:
CONRAD A. DIETERICH,
WILLIAM P. JONES.